United States Patent [19]

Hickey

[11] 3,854,807

[45] Dec. 17, 1974

[54] SLIDE TRAY POSITIONING MECHANISM FOR A REAR-SCREEN PROJECTOR

[75] Inventor: Roy E. Hickey, Honeoye Falls, N.Y.

[73] Assignee: The Singer Company, New York, N.Y.

[22] Filed: May 29, 1973

[21] Appl. No.: 364,469

[52] U.S. Cl. .................... 353/78, 353/92, 353/111, 353/117
[51] Int. Cl. ........................ G03b 21/14, G03b/23/06
[58] Field of Search ................. 353/88, 92, 95, 111, 353/117, 78

[56] References Cited
UNITED STATES PATENTS

| | | | |
|---|---|---|---|
| 2,922,334 | 1/1960 | Krull | 353/111 |
| 3,276,314 | 10/1966 | Robinson | 353/111 |
| 3,507,571 | 4/1970 | White | 353/78 |

Primary Examiner—Samuel B. Rothberg
Assistant Examiner—Steven L. Stephan
Attorney, Agent, or Firm—Charles R. Lewis

[57] ABSTRACT

A slide projector having a slide gate located within a rear-screen projector housing includes a slide tray positioning mechanism in cooperative relation with a gravity feed slide tray which is removably mounted on the rear-screen projector housing. The slide tray indexing mechanism rotates the slide tray relative to the projector gate to successively bring slides in the slide tray, one at a time, in registration with the projector gate.

8 Claims, 7 Drawing Figures

PATENTED DEC 17 1974

3,854,807

SHEET 1 OF 3

SLIDE TRAY POSITIONING MECHANISM FOR A REAR-SCREEN PROJECTOR

BACKGROUND OF THE INVENTION

1. Field of the Invention

This invention relates to slide tray positioning mechanisms and more particularly to a slide tray positioning mechanism that is contained within a rear-screen projector housing but in cooperative relation with a slide tray removably mounted on the exterior of the rear-screen projector housing.

2. Description of the Prior Art

Heretofore in the prior art, most rear-screen projectors have utilized standard slide projectors designed for projecting an image onto the front of a screen disposed in a room. The standard slide projector is typically contained within the rear-screen projector and its projected image folded one or more times by mirror(s) before being projected onto the rear of a viewing screen contained in one side of the rear-screen projector housing. This arrangement results in the rear-screen projector housing having to be at least large enough to enclose the standard slide projector. Not only does this result in a relatively large and bulky rear-screen projector that is cumbersome to handle, but the image bearing slides associated with the projector and the operating mechanisms of the standard projector, such as the slide tray positioning mechanism, are not readily available to the user since they are contained within the rear-screen projector housing.

Accordingly, one object of this invention is to provide an improved slide tray indexing mechanism.

Another object of this invention is to provide a slide tray positioning mechanism for a rear-screen projector.

Still another object of this invention is to provide an improved slide tray positioning mechanism that is contained within a rear-screen projector and in cooperative relation with a slide tray removably mounted on the exterior of the rear-screen projector housing.

SUMMARY OF THE INVENTION

Briefly described, the present invention includes positioning means adapted to rotate a slide tray, containing a plurality of image bearing slides, relative to a projector gate for successively bringing slides in the slide tray into vertical registration with the projector gate. The positioning means includes a driven indexing bar having a slide tray indexing element at one end thereof; means in contact with the driven indexing bar guides the indexing element to a position between two adjacent indexing pins depending from the slide tray, after which a pivoted means causes the driven indexing bar to be rotated around the pivot of the pivoted means to rotate the slide tray thereby causing the next slide in the tray to be positioned above the projector gate.

More specifically, the projector gate and slide tray positioning mechanism are contained within a rear-screen projector housing with the slide tray removable mounted on the exterior of the rear-screen projector housing. The image projected by the projector is folded one or more times within the housing by mirror(s) before being projected onto the rear of a viewing screen contained in a wall of the rear-screen projector housing.

BRIEF DESCRIPTION OF THE DRAWINGS

The various features, objects and advantages of the present invention will be readily apparent from the following detailed description taken in conjunction with the following drawings, wherein like reference characters designate like or corresponding parts throughout the several views, and wherein.

DESCRIPTION OF THE INVENTION

Figure 1:
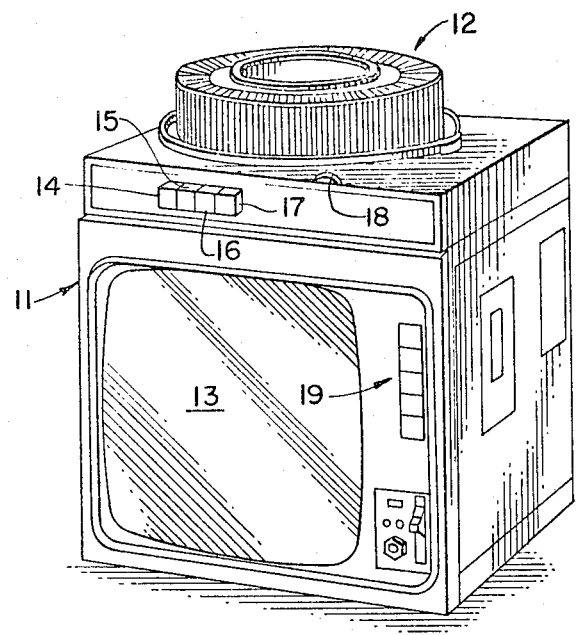
FIG. 1 is a perspective view of a rear-screen projector which may utilize the present invention.

Apparatus which may utilize the present invention is shown in FIG. 1 as comprising a rear-screen projector having a housing 11 in the general shape of a cube. A gravity feed slide tray 12, such as that used with a Kodak Carousel projector, is removably mounted on the top of the rear-screen projector. Located within the housing 11 beneath the slide tray 12 is a slide tray and slide positioning mechanism which includes the slide tray positioning mechanism of this invention (not shown FIG. 1) and having a slide projector optical system associated therewith. The slide projector projects the image of successive slides in the slide tray onto the rear of a viewing screen 13 contained in the front of the rear-screen projector housing 11. Since the screen 13 is located near the image being projected, it is necessary that the path of the projected image be folded one or more times before being displayed on the screen 13. This is accomplished by the use of one or more mirrors (not shown FIG. 1) within the housing 11 in a well known manner. This enables a much larger image to be obtained on the viewing screen 13 than could be obtained within the confines of the projector housing 11 without folding the optical path of the projected image.

The rear-screen projector can be operated by a plurality of manually actuated, push buttons 14, 15, 16 and 17 located above the viewing screen 13. Push button 14 actuates an ON-OFF switch which controls electrical power to the rear-screen projector. Manually actuated push button 15 is an ADVANCE device which causes the next slide in the slide tray to be projected onto the viewing screen 13. If the ADVANCE push button 15 is held in the depressed state, the slide tray will continue to advance resulting in successive slides being projected, in sequence, onto the viewing screen 13. Manually actuated push button 16 provides a SELECT control. When actuated, the SELECT push button 16 disables the automatic slide tray indexing, or positioning, means and allows the slide tray 12 to be manually located to any desired position. Manually actuatable push button 17 provides a HOLD function which, when actuated, disables the automatic slide tray indexing, or positioning, means to prevent projection of successive slides in the slide tray 12 until release of the HOLD push button 17.

The rear-screen projector housing 11 may also enclose a cassette tape deck, (not shown) the standard control buttons 19 for which are shown as being located to the right of the viewing screen 13. In addition to providing audio accompanyment to the images projected on the viewing screen 13, the cassette tape may also include a cue tract that provides electrical pulses for actuating the slide tray and slide positioning mechanism to control the sequence of slide images projected onto the viewing screen 13 in synchronism with the audio.

Additionally, a hand held switch (not shown) connected to the rear-screen projector by an electrical cable (not shown) may be utilized to operate the rear-screen projector.

A control knob 18 extending from the top of the rear-screen housing provides a focus adjustment for the image projected onto the viewing screen 13.

Figure 2A:
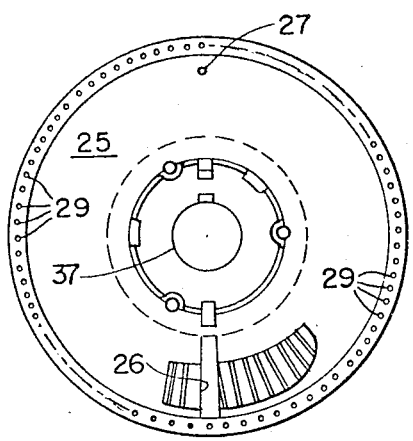
FIG. 2a illustrates the bottom of the slide tray used with the rear-screen projector of FIG. 1.
Figure 2B:
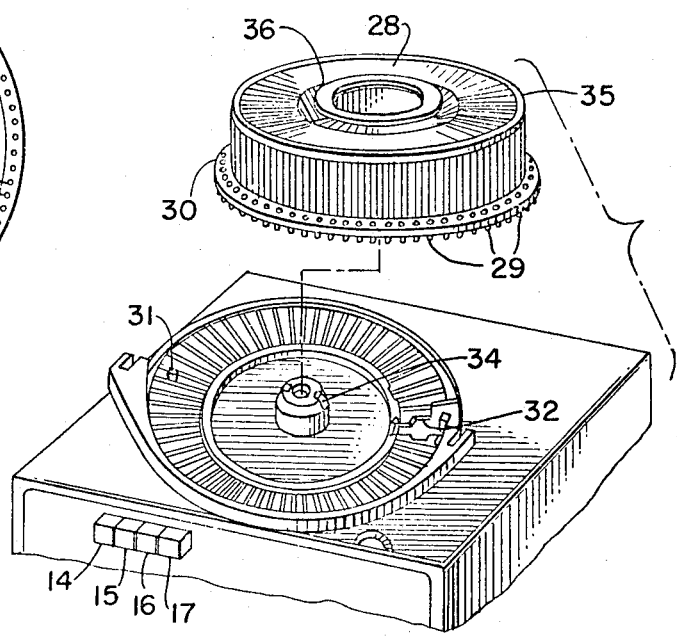
FIG. 2b illustrates the top surface of the rear-screen projector and the slide tray with which it cooperates.

The gravity feed slide tray 12 and the cooperative relationship between the slide tray 12 and the top of the rear-screen projector is substantially identical to that described in U.S. Pat. No. 3,276,156 filed Feb. 23, 1962 in the name of Herbert T. Robinson, the disclosure of which is incorporated herein by reference. Briefly described, however, and as shown in FIGS. 2a and 2b, the slide tray 12 contains a first portion 25, such as an annular disk, having an opening therein 26 through which successive slides contained in the slide tray may pass and another opening 27 for properly locating the slide tray 12 on the top of the rear-screen projector. A second portion 28 of the slide tray includes inner 36 and outer 35 concentric walls with a plurality of separators connected therebetween to form slide compartments and is rotatably coupled to the first portion 25. Additionally, the second portion contains a plurality of indexing pins 29 depending from a rim 30 thereon which enable the second portion 28 to be rotated relative to the first portion 25 in a manner as described hereinbelow.

An opening 37 in the center of the slide tray 12 is designed to fit over a spindle 34 protruding from the top of the rear-screen projector. A positioning pin 31 projecting from the top of the rear-screen projector engages the opening 27 in the first portion 25 of the slide tray 12 to accurately locate the slide tray on the top of the rear-screen projector and retain the first portion 25 of the slide tray 12 in a fixed position. An opening 32 in the top of the rear-screen projector is located above the projector gate (not shown FIGS. 2a and 2b) within the rear-screen housing 11 and below the opening 26 in the slide tray 12. When indexed by the slide tray positioning mechanism described hereinbelow, successive slides in the slide tray 12 are positioned over the opening 26 in the slide tray 12 which is located over the opening 32 in the rear-screen projector 11 so that successive slides can be lowered into the projector gate 62 (FIG. 3) and projected onto the screen 13 of the rear-screen projector and then placed back in the slide tray 12.

Figure 3:
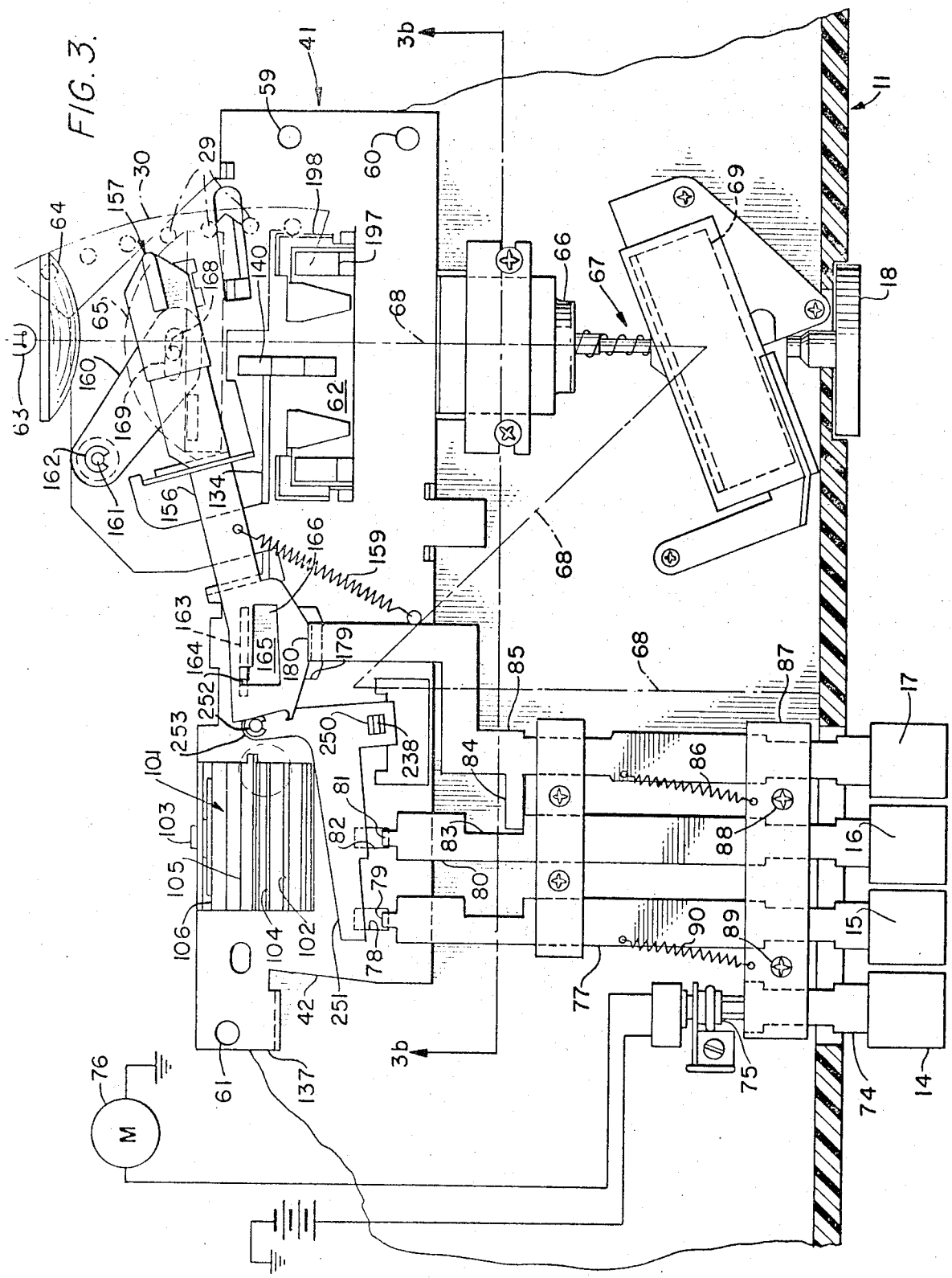
FIG. 3 illustrates a slide tray and slide positioning mechanism, which includes the slide tray positioning mechanism of this invention, in the optical path of the rear-screen projector of FIG. 1.

Referring now to FIG. 3, a slide tray and slide positioning mechanism, which includes the slide tray positioning mechanism of this invention, is illustrated as including an elongated rectangular housing 41 having at least a top side member 42. The rectangular housing 41 is mounted to the underside of the top of the rear-screen projector housing by means of the openings 59, 60 and 61 on the side member 42 by any number of well known means (not shown).

A projector gate 62 is located in the right hand portion of the housing 41 and is positioned under the opening 32 in the top of the rear-screen projector housing (FIG. 2a). An electric lamp 63 is located behind the projector gate 62 with condenser lens 64 and 65 being located between the projector lamp 63 and the projector gate 62. Mounted in front of the projector gate 62, in line with the optical path 68 of the projector is an objective lens barrel 66 having an adjustable focusing mechanism 67 attached thereto which is coupled to the focusing control knob 18. Since the image on a slide is projected onto the rear of the viewing screen 13, the light from the projector lamp 63 is projected through a slide (not shown) in the projector gate 62, through a mirror system and onto the viewing screen 13. Located at an angle to the optical path 68 of the projector is a mirror 69 which is secured to the rear-screen projector housing 11 by any number of well known means (not shown). This mirror may be adjustably mounted in a manner as described in co-pending application entitled ADJUSTABLE MIRROR MOUNT filed May 29, 1973 and having serial number 364,471. The mirror 69 folds the optical path 68 of the projector by projecting the optical path 68 beneath the rectangular housing 41 toward the rear of the rear-screen projector housing 11 to a second mirror (not shown) the surface of which is parallel to the mirror 69. The second mirror directs the optical path 68 onto the rear of the viewing screen 13.

Located at the left hand portion of the housing 41 are the manually actuated push buttons 14, 15, 16 and 17 discussed hereinabove in conjunction with FIG. 1. ON-OFF push button 14 contains a flat elongated member 74 extending into the rear-screen projector housing 41. Actuation of the ON-OFF push button 14 causes actuation of an electrical switch 75 which is in contact with member 74 and which controls application of electrical power to the rear-screen projector components such as the projector lamp 63 and an electric motor 76, etc. The ADVANCE push button 15 includes an elongated member 77 having a depending portion 79 at the end thereof which extends into an opening 78 in the side 42 of the housing 11. The ADVANCE push button 15 is biased to its normal position by a spring 90 connected between the elongated member 77 and a retaining and positioning member 87 secured to the rear-screen projector housing 41 by any number of suitable means such as the screws 88 and 89. The extent of movement of the ADVANCE push button 15 is controlled by the opening 78. In like manner, the SELECT push button 16 contains an elongated member 80 having a dependent portion 81 at one end thereof that extends into an opening 82 in the side member 42. The elongated member 80 contains an indented portion 83 into which extends a dog 84 that laterally extends from an elongated portion 85 associated with the HOLD push button 17. As will be obvious from a perusal of FIG. 3, actuation of the SELECT push button 16 also causes actuation of the HOLD push button 17 while actuation of the HOLD push button 17 does not cause actuation of the SELECT push button 16. Accordingly, only a single biasing spring 86 connected between the elongated member 85 of the HOLD push button 17 and the retaining member 87 is needed to bias both the SELECT 16 and HOLD 17 push buttons to their normal positions. The portion 85 of the HOLD push button 17 also contains a dependent portion 180 at the end thereof that extends into an opening 179 in the side member 42.

Also located in the left portion of the rectangular housing 41 is a cam block (FIG. 3) 101 including a plurality of cams 106, 104, 105 and 102 which are operatively associated with the various portions of the slide tray and slide positioning mechanism which includes the slide tray positioning mechanism of this invention and which is operatively associated with cam 105. The cam block 101 is rotatably mounted on a shaft 103 which extends through the rectangular housing 41 and is driven by a wrap spring clutch (not shown) which in turn is coupled to and driven by the motor 76 by any suitable means (not shown).

When actuated by closing the clutch (not shown), rotation of the cam block 101 through 360° constitutes one complete cycle of operation of the slide tray and slide positioning mechanism. During a cycle of operation, an image bearing slide within the projector gate 62, if any, is returned to the slide tray 12, the slide tray 12 indexed by the mechanism of this invention and the next image bearing slide lowered into the projector gate 62 for projection on the screen 13.

The slide tray positioning portion of the slide tray and slide positioning mechanism, which constitutes the subject matter of this invention, can best be understood with reference to FIGS. 3, 4a, 4b and 4c.

In order to clearly illustrate the slide tray positioning mechanism, all of the elements are not illustrated in FIG. 3. Further, elements or parts shown in one Figure, for purposes of clarity, do not appear in another Figure. However, FIG. 3 taken together with FIGS. 4a, 4b and 4c constitute a clear and complete illustration of the features of the slide tray positioning mechanism of this invention. An elongated cam follower 151 (FIG. 4a) has one end 152 thereof rotatably mounted on a shaft 50 that extends through the rectangular housing 41. The other end 153 of the cam follower 151 extends through an elongated opening 163 (FIG. 3) in the side member 42 of the rectangular housing 41. Intermediate the ends 152 and 153 of the cam follower 151 is a cam cooperating surface 155 that is held in engagement with the camming surface 150 of the cam 105 by means of a spring 154 which is coupled between the cam follower 151 and the side 42 of the rectangular housing 41.

Figure 4A:
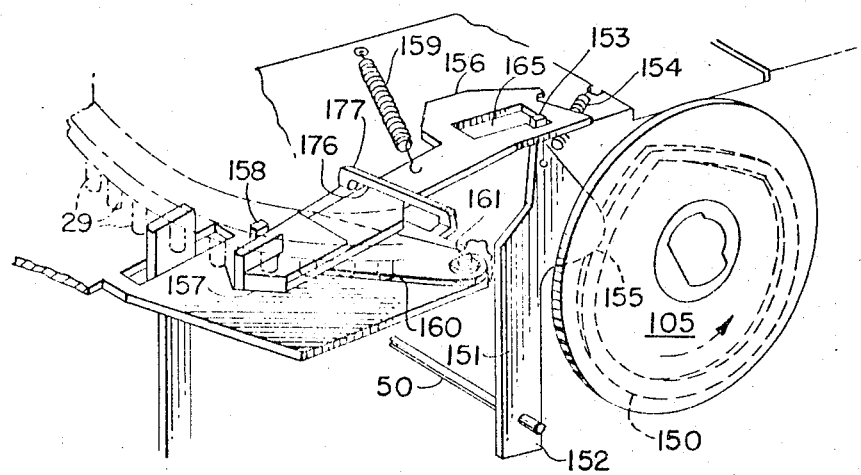
FIG. 4a illustrates the slide tray positioning mechanism of this invention at one of its operating postions.

Extending through an opening 176 in an upraised portion 177 of the side member 42 is a flat, elongated indexing bar 156 (FIG. 4a). One end of the indexing bar 156 contains an opening 165 having a first portion 164 and a second portion 166 with the end 153 of the cam follower 151 extending through the side member 42 also extending through the first portion 164 of the opening 165 in the indexing bar 156 as shown in FIGS. 3 and 4a. A spring 159 connected between the indexing bar 156 and the side member 42 biases the indexing bar 156 to its initial position against a stop 158 extending from the side member 42 and against the end 153 of the cam follower 151 extending through the opening 163 in the side member 42. Attached to the other end of the indexing bar 156 is a bevelled slide tray indexing element 157. A flat, pivoted member 160 has one end thereof rotatably coupled to the side member 42 by any well known means such as a stud 161 and retaining ring 162. The other end of the pivoted member contains an elongated slot 169 into which extends a guide pin 168 depending from the bottom of the indexing bar 156. (FIG. 3)

Figure 4B:
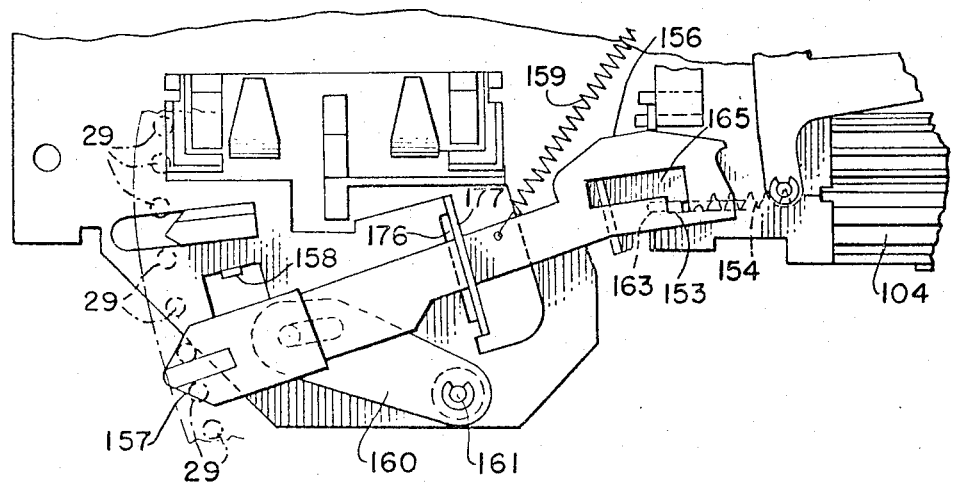
FIG. 4b illustrates the mechanism of FIG. 4a at another one of its operative positions.
Figure 4C:
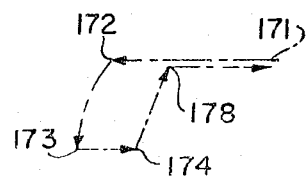
FIG. 4c is a vector diagram that illustrates the movement of the tray indexing end of the tray indexing bar illustrated in FIG. 3.

The camming surface 150 of the tray indexing cam 105 is designed so that shortly after the initiation of a projector cycle, the end 153 of the cam follower 151 is driven in a counter-clockwise direction (FIG. 4a) around the shaft 50 and within the elongated slot 163 in the side member 42 to bear against the wall of the first portion 164 of the opening 165 in the indexing bar 156 such that the indexing bar 156 is guided forward in a straight line established by a guide 158 upraised from the side 42 of the housing 41 and the end of the cam follower 151. This movement is illustrated by the vector diagram in FIG. 4c as movement of the slide tray indexing element 157 of the indexing bar 156 from the initial position indicated by the reference numeral 171 to a next position indicated by the reference numeral 172. When in the position indicated by reference numeral 172, at which time the pin 168 is located at the end of the elongated slot 169 in the pivoted member 160, the slide tray indexing element 157 on the indexing bar 156 will be positioned between two adjacent indexing pins 29 depending from the slide tray (FIG. 4a). At this time, the slide tray 12 is locked in position by the indexing bar 156. The camming surface 150 of the cam 105 further drives the cam follower 151 in a counter-clockwise direction around the shaft 50 (FIG. 4a). However, since the pin 168 extending from the indexing bar 156 into the elongated slot 169 in the pivoted member 160 can travel no further in the slot 169, continued driving of the indexing bar 156 by the end 153 of the cam follower 151 causes the pivoted member 160 and the indexing bar 156 to be rotated around the pivotal axis 161 of the pivoted member 160 (FIG. 4b). This in turn causes the slide tray indexing element 157 now located between two adjacent indexing pins 29 depending from the slide tray 12, to rotate the slide tray 12. This indexing motion is illustrated by movement of the indexing element 157 between points 172 and 173 in the vector diagram of FIG. 4c. This slide tray movement causes the next successive slide in the slide tray 12 to be located over the opening 26 in the bottom 25 of the slide tray 12. This enables the slide at the opening 26 to be lowered into the projector gate 62 by any well known means for projection. Once the new slide has entered the projector gate 62, the camming surface 150 of the cam 105 is such that clockwise rotation of the cam follower 151 is achieved under urging of the spring 154. This causes the end 153 of the cam follower 151 extending into the first portion 164 of the opening 165 in the indexing bar 156 to drive the indexing bar 156 and the indexing element 157 from between adjacent indexing pins 29 depending from the slide tray 12. This is shown in the vector diagram of FIG. 4c as the travel between points 173 and 174. Once the slide tray indexing element 157 is disengaged from between adjacent indexing pins 29 depending from the slide tray 12, the spring 154 will bias the indexing bar 156 against the stop 158 as is illustrated by the movement between points 174 and 178 in the vector diagram of FIG. 4c. Further movement of the cam follower 151 in the counter-clockwise direction (FIG. 4a) will cause the indexing bar 156 to be driven to its initial position in cooperation with the spring 159 (FIG. 3) which is shown in the vector diagram of FIG. 4c as the movement between points 178 and 171.

As will be apparent from the above description, the tray indexing mechanism of this invention is actuated once for each projector cycle. Also, the operation of the entire slide tray and slide positioning mechanism shown in FIG. 3, of which the present invention is a part, is described in detail in copending U.S. Pat. application having Ser. No. 364,470 filed May 29, 1973 and entitled SLIDE TRAY AND SLIDE POSITIONING MECHANISM, the disclosure of which is incorporated herein by reference.

Other embodiments and modifications of the invention described herein will be apparent to those skilled in the art without departing from the spirit and scope of this invention as defined by the following claims.

What is claimed is:

1. Apparatus for positioning a slide tray comprising:

a slide projector including a gate;
   a slide tray including a plurality of indexing pins depending therefrom and adapted to contain a plurality of slides for projection by said projector;
   indexing means adapted to rotate said slide tray relative to said gate for successively bringing slides in said slide tray, one at a time, into substantially vertical register with said projector gate;
   said indexing means including:
   a driven indexing bar having a slide tray indexing element at one end thereof;
   pivoted means including a rotatably pivoted, substantially flat, member having a slot therein a distance from said pivot; coupled to said indexing bar by means of a pin depending from said driven indexing bar and extending into said slot in said pivoted member; said pivoted means guiding said indexing element to a position between two adjacent pins depending from said slide tray and then rotating said indexing bar around the pivot of said pivoted means to rotate said slide tray as said indexing bar is driven.

2. The apparatus according to claim 1 further including:

a housing;
   said projector and said indexing means located within said housing;
   said slide tray located on said housing;
   said housing including a display surface for viewing the projected image of said slides; and
   means contained within said housing for folding the optical path of said projector at least once.

3. The apparatus according to claim 2 further including:

manually actuated means mounted on said housing for selectively actuating said projector.

4. The apparatus according to claim 1 further including:

means biasing said driven indexing bar to an initial position where the pin depending from said driven indexing bar is adjacent one end of said slot in said pivoted member; and
   said pin depending from said driven indexing bar positioned at the other end of said slot in said pivoted member when said indexing element of said driven indexing bar is positioned between two adjacent indexing pins depending from said slide tray.

5. The apparatus according to claim 1 wherein:

said indexing bar includes an opening therein located a distance from said indexing element;
   a driving member extending through said opening for driving said indexing bar.

6. The apparatus according to claim 5 wherein:

said driving member has reciprocal motion.

7. The apparatus according to claim 1 wherein:

said indexing bar includes an opening therein located a distance from said indexing element;
   a driving member having reciprocal motion extending through said opening for driving said indexing bar.

8. The apparatus according to claim 7 wherein:

said driving member has reciprocal motion.

* * * * *